MAGNETIC DEVICE USING PRINTED CIRCUITS

Filed Oct. 27, 1960

INVENTOR.
Rudolph O. Stoehr

BY C. A. Gelbrandsen

Atty.

United States Patent Office 3,492,665
Patented Jan. 27, 1970

3,492,665
MAGNETIC DEVICE USING PRINTED CIRCUITS

Rudolph O. Stoehr, Des Plaines, Ill., assignor to Automatic Electric Laboratories, Inc., Northlake, Ill., a corporation of Delaware Filed Oct. 27, 1960, Ser. No. 65,462
Int. Cl. G11b 5/00
U.S. Cl. 340—174 5 Claims

ABSTRACT OF THE DISCLOSURE

A technique of making a magnetic memory core array. In this technique insulating cards carrying printed conductors are assembled into a laminated block, with the conductors insulated from the top surface and the bottom surface of the block; apertures are perforated through the block, with the apertures extending in a direction normal to the above surfaces and with the conductors crossing between each pair of the apertures, and films of magnetic material are applied to the apertures as well as between these apertures on the aforementioned top and bottom surfaces. In this manner loops are formed which surround the conductors and define cores of the array.

This invention relates to magnetic devices and more particularly, to a method for producing printed magnetic core matrices.

The art of printed circuitry has been developed to an extent whereby conductors, resistors, and inductors, are made by means of this general technique. The present invention envisions a novel and improved printed circuit technique for making magnetic devices and more specifically, magnetic memory cores which are used, for instance, in electronic computers.

Therefore, the primary object of this invention is to provide a method for making magnetic devices using printed circuit techniques.

Another object of this invention is to simplify and reduce the cost of manufacture of magnetic core memory matrices.

Another object of this invention is to provide a magnetic device using novel and improved printed circuit techniques.

The invention features in general a number of printed circuit cards which are arranged into a laminated block. Formed within this block are a series of holes through and between which loops of magnetic material are formed by printed circuit techniques, which serve as cores around the conductors printed on the cards.

Other objects and features of this invention will become more apparent from the following detailed description taken in conjunction with the drawings of which:

Figure 1:
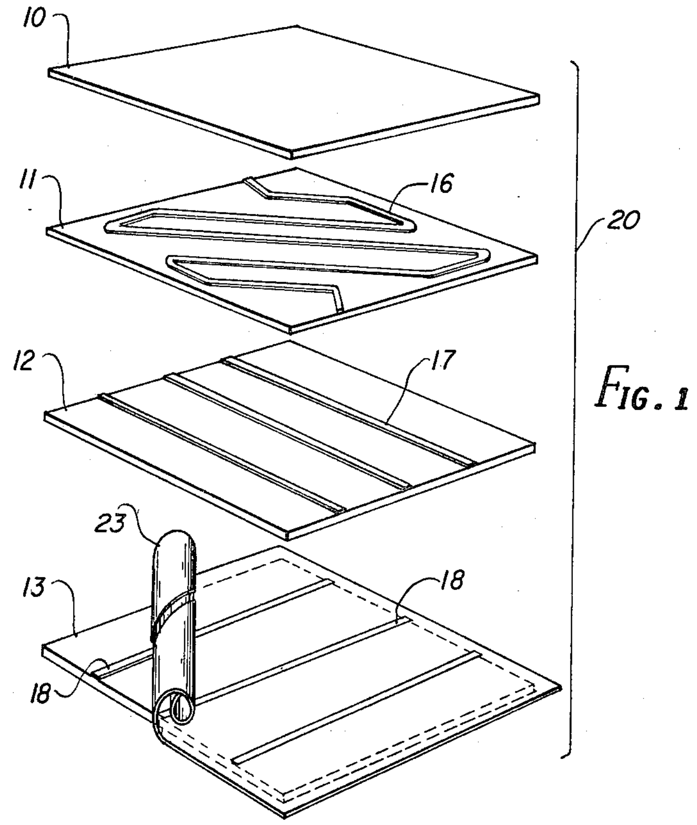
FIGURE 1 is an exploded perspective view showing the printed conductors formed on the cards and their physical arrangement in the featured disclosure.

Referring now to FIGURE 1, references 10, 11, 12 and 13 designate four cards which are made of insulating material, for example, a plastic material. The number of cards used and their size together with the number and size of the magnetic cores vary with the requirements of the particular memory core matrix. Therefore, the 3 x 3 matrix and the number of cards shown in the drawings have been disclosed by way of example only. Formed on the cards are conductors 16, 17 and 18, respectively, which serve as the windings for the matrix. More specifically, winding 16 serves as the sense winding, winding 17 the X winding, and winding 18 the Y winding. The cards are stacked upon each other so as to form a laminated block 20 through which extends a series of holes 21. These holes are positioned in any desired place in the block as long as any one pair of these holes is substantially normal to and spaced from at least one conductor. With the holes 21 in such a position a loop or loops of magnetic material 22 around the conductors are formed in the manner more specifically described below. These loops 22 extend through the holes 21 and over the outer surfaces of the top and bottom cards, 10 and 13 respectively, therebetween to serve as the cores of the memory matrix.

The method of producing the just described device involves the following steps:

First, the windings 16, 17 and 18 are formed on the individual cards. This is accomplished by any one of a number of known printed circuit techniques. For example, by chemical deposition or by the method of etching a sheet of conductive material bonded to an insulating card until only the desired circuit pattern remains. By way of illustration the chemical deposition method and the electroplating method will be explained in connection with the present invention.

Accordingly, stencil 23 is placed over the card which is to have the conductor, leaving the designated space for this conductor exposed. Then a film of conducting material is applied to the stencil by placing the card into a conductive material solution, for instance. Upon removing the card, sufficient conductive material will adhere to the insulating cards to form the desired conductors at the desired areas. In the event that a heavier layer of conductive material is desired it would be possible to use the initial film as the cathode and electroplate further amounts of conductive material on it.

After the conductors 16, 17 and 18 are formed on the cards in the above manner or by any of the other known methods, the second step is to assemble them into a laminated block 20. This is done by spreading an adhesive bonder between the adjacent surfaces of the cards and stacking them upon each other. It is understood that there are no conductors disposed on the outer surfaces of the top and bottom cards so that they insulate the conductor from the subsequently formed magnetic cores.

Figure 2:
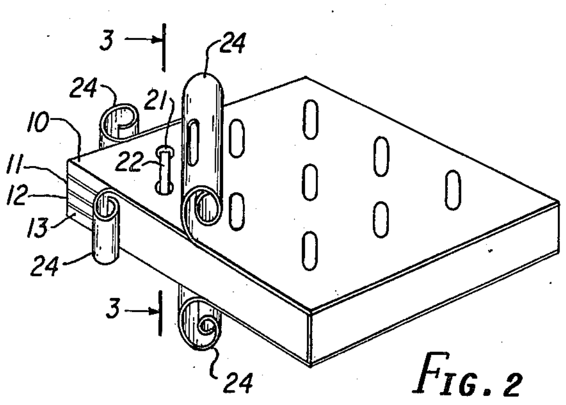
FIGURE 2 is an assembly view of the cards formed into a laminated block having perforated holes extending therethrough.
Figure 3:
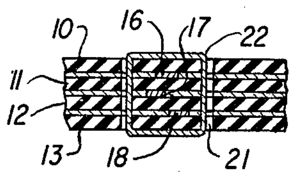
FIGURE 3 is a cross-sectional view taken substantially on lines 3—3 showing the loop or film of magnetic material which surrounds the conductors of the block.

Referring now to FIGURE 2 of the drawings, a series or an array of holes 21 are perforated or drilled into the block 20. It may be necessary to heat the block when perforating or drilling the holes so as not to crack or break the insulation between the conductors. With the holes 21 thusly formed in the block another stencil 24 is placed over the entire outer surfaces of the block which outlines the top and bottom legs of the cores 22 which are to be subsequently formed.

Cores 22 are formed, for example, by the same process used to form conductors 16, 17 and 18. To illustrate, a conductive strip or film of copper is deposited on the unmasked portions of the multi-layer block forming a closed loop around the printed conductors. The loop extends from the top surface of the block, through one hole over the bottom surface of the block, and then through the second hole of the pair back to the top surface. After the loops of conductive material are formed the next step is to apply magnetic material to them. This can be done by electrolytic action with the film of copper serving as the cathode and the magnetic material serving as the anode. After a sufficient layer or build up of material is disposed to give the proper magnetic core characteristics, stencil 24 is removed from the block.

It should now be apparent that according to the invention both the circuit conductors 16, 17 and 18 and the magnetic cores 22 are produced by printed circuit techniques. This new approach results in a substantially simplified core matrix construction of minimum cost. No longer is it necessary to employ special means to thread cores.

This invention has been described in detail, however, it is to be understood that the present disclosure has been made only by way of example and numerous changes in the detailed method or structure may be made without departing from the scope of my invention.

What is claimed is:

1. A memory device, comprising:
a pair of magnetic bars one facing the other;
sheeting between said bars;
a pair of magnetic slugs disposed in apertures of said sheeting and interconnecting end portions of said bars to form a closed frame, said frame having high magnetic permeability and at least one of said bars also having high magnetic remanence; and
core windings on said sheeting, extending through and angularly disposed relative to said frame.

2. As a memory unit,
a pair of generally parallel magnetic core elements, one facing the other;
sheeting between said core elements;
magnetic core elements disposed in apertures of said sheeting and interconnecting end portions of said generally parallel core elements; and
core windings on said sheeting, indexed with and angularly disposed relative to said pair of generally parallel core elements;
all of said core elements having high permeability and at least one also having high remanence.

3. In a core unit of the type using printed core plane windings:
a pair of parallel, magnetizable members indexed with a crossing of said windings, said windings and magnetizable members being disposed in parallel planes; and
a second pair of magnetizable members, disposed between end portions of said parallel members and interconnecting said end portions to form a complete magnetic circuit frame;
at least one of the four members having high magnetic remanence.

4. A memory core unit comprising.
a first pair of magnet elements, one parallel to and coextensively facing the other,
non-magnetic and electrically non-conductive sheeting between said magnet elements,
a second pair of magnet elements, disposed in apertures of said sheeting, transversely of the first pair and interconnecting portions of the first pair into a closed magnet frame; and
electric conductors in said sheeting, extending between and beyond the magnet elements of said first and second pairs, for switching magnetic signals into and out of said magnet frame; at least one of the elements of said frame having high magnetic remanence.

5. A memory plane comprising:
a generally flat system of core windings including write-in and read-out windings, disposed to provide crossings thereof; and
a pair of generally flat arrays of individual, parallel core bars, one array generally closely overlying and the other array generally closely underlying said system of core windings, each array including a core bar for each of said crossings and each resultant pair of core bars being arranged to form in substance a closed magnetizable high remanence ring around one of said crossings.

References Cited

UNITED STATES PATENTS

| | | | |
|---|---|---|---|
| 2,878,463 | 3/1959 | Austen | 340—174 |
| 2,901,736 | 8/1959 | Sylvester | 340—174 |
| 2,877,540 | 3/1959 | Austen | 29—155.5 |
| 2,961,745 | 11/1960 | Smith | 29—155.5 |
| 2,910,675 | 10/1959 | Gessner | 340—174 |
| 3,025,502 | 3/1962 | Gellert | 340—174 |
| 3,027,548 | 3/1962 | Vaughan | 340—174 |
| 2,897,409 | 7/1959 | Gitto | 29—155.5 |
| 2,937,351 | 5/1960 | Craig | 29—155.5 |
| 2,988,668 | 6/1961 | Lincoln et al. | 340—174 |
| 3,138,785 | 6/1964 | Chapman et al. | 340—174 |

JAMES W. MOFFITT, Primary Examiner

U.S. Cl. X.R.

29—604